(12) United States Patent
Hassan et al.

(10) Patent No.: US 12,128,333 B2
(45) Date of Patent: Oct. 29, 2024

(54) MONOMER RECOVERY PROCESS

(71) Applicant: Dow Global Technologies LLC, Midland, MI (US)

(72) Inventors: Abu Mokhtarul Hassan, Pearland, TX (US); Dennis W. Jewell, Angleton, TX (US); Sven Claessens, Lokeren (BE)

(73) Assignee: Dow Global Technologies LLC, Midland, MI (US)

( * ) Notice: Subject to any disclaimer, the term of this patent is extended or adjusted under 35 U.S.C. 154(b) by 407 days.

(21) Appl. No.: 17/424,841

(22) PCT Filed: Feb. 4, 2020

(86) PCT No.: PCT/US2020/016670
§ 371 (c)(1),
(2) Date: Jul. 21, 2021

(87) PCT Pub. No.: WO2020/163400
PCT Pub. Date: Aug. 13, 2020

(65) Prior Publication Data
US 2022/0088503 A1    Mar. 24, 2022

Related U.S. Application Data

(60) Provisional application No. 62/802,254, filed on Feb. 7, 2019.

(51) Int. Cl.
*B01D 3/40* (2006.01)
*C08F 212/10* (2006.01)
*C08F 220/44* (2006.01)

(52) U.S. Cl.
CPC .............. *B01D 3/40* (2013.01); *C08F 212/10* (2013.01); *C08F 220/44* (2013.01)

(58) Field of Classification Search
CPC ................................... B01D 3/40; B01D 3/43
See application file for complete search history.

(56) References Cited

U.S. PATENT DOCUMENTS 2,807,573 A    9/1957   Robertson et al.
3,278,457 A    10/1966  Milgrom
(Continued)

FOREIGN PATENT DOCUMENTS

CN    104045773 A    9/2014
CN    104045775 A    9/2014
(Continued)

OTHER PUBLICATIONS

Sazonova et. al, "Recovery of Acetonitrile from Aqueous Solutions by Extractive Distillation", International Journal of Chemical and Molecular engineering vol. 9, 2015, p. 288-291.
(Continued)

*Primary Examiner* — Natalia Levkovich (57) ABSTRACT

A process for recovering monomers and solvent present in a waste stream including the steps of: (a) providing a waste feed stream containing monomers, solvent and impurities; (b) subjecting the waste feed stream of step (a) to a separation process under conditions for separating the monomers and solvent from the impurities of the waste stream; (c) recovering the monomers and solvent in one or more streams; and (d) passing the one or more of the monomer and solvent streams from step (c) to further processing.

2 Claims, 8 Drawing Sheets

(56) References Cited

U.S. PATENT DOCUMENTS

| | | |
|---|---|---|
| 3,278,458 A | 10/1966 | Belner |
| 3,278,459 A | 10/1966 | Herold |
| 3,327,334 A | 6/1967 | Wilmanns et al. |
| 3,404,109 A | 10/1968 | Milgrom |
| 3,427,256 A | 2/1969 | Milgrom |
| 3,427,335 A | 2/1969 | Herold |
| 3,445,347 A | 5/1969 | Borrel et al. |
| 4,513,124 A | 4/1985 | Hoffman |
| 4,588,830 A | 5/1986 | Fisk et al. |
| 4,640,935 A | 2/1987 | Fisk et al. |
| 4,745,153 A | 5/1988 | Hoffman |
| 4,997,957 A | 3/1991 | Meul et al. |
| 5,081,180 A | 1/1992 | Bourguignon et al. |
| 5,196,476 A | 3/1993 | Simroth |
| 5,854,386 A | 12/1998 | Shen et al. |
| 5,990,185 A | 11/1999 | Fogg |
| 6,013,731 A | 1/2000 | Holeschovsky et al. |
| 6,613,827 B2 | 9/2003 | Lundgard et al. |
| 7,160,975 B2 | 1/2007 | Adkins et al. |
| 7,179,882 B2 | 2/2007 | Adkins et al. |
| 7,759,427 B2 | 7/2010 | Wood et al. |
| 7,776,969 B2 | 8/2010 | Adkins |
| 9,604,153 B1 * | 3/2017 | Quinlan ............ H01L 21/02101 |
| 2004/0266958 A1 | 12/2004 | Borst et al. |
| 2005/0085613 A1 | 4/2005 | Adkins et al. |
| 2007/0060690 A1 | 3/2007 | Adkins et al. |
| 2009/0281206 A1 | 11/2009 | Van der Wal et al. |
| 2018/0353875 A1 | 12/2018 | Sa Gomes et al. |
| 2019/0389981 A1 | 12/2019 | Kanauchi et al. |

FOREIGN PATENT DOCUMENTS

| | | |
|---|---|---|
| CN | 105585652 A | 5/2016 |
| CN | 106866893 A | 6/2017 |
| CN | 108623757 A | 10/2018 |
| EP | 0786480 A1 | 7/1997 |
| WO | 2009/155427 A2 | 12/2009 |
| WO | 2018142965 A1 | 11/2019 |

OTHER PUBLICATIONS

Raeva et al., "Separation of ternary mixtures by extractive distillation with 1,2-ethandiol and glycerol" Chemical Engineering Research and Design, vol. 99, 2015, p. 125-131.

Kim et. al., "Entrainer Selection and Solvent Recycling in Complex Batch Distillation" Chemical Engineering Communications, vol. 191, 2004, p. 1606-1633.

PCT/US2020/016670, International Search Report and Written Opinion with a mailing date of May 29, 2020.

PCT/US2020/016670, International Preliminary Report on Patentability with a mailing date of Aug. 10, 2021.

Office Action from corresponding Chinese 202080015344.3 application, dated Jan. 5, 2023.

* cited by examiner

MONOMER RECOVERY PROCESS

FIELD

The present invention relates to a process for recovering monomers and solvent from a waste stream generated by a copolymer polyol (CPP) composition production process.

BACKGROUND

Generally, in a production process for producing polyurethane foams, a reaction mixture of a polyol with a polyisocyanate and other additives such as catalysts are used to prepare a foam-forming polyurethane reaction mixture composition which, in turn, can be used to produce a polyurethane foam. Copolymer polyols (CPP) can be used, and are highly desired, as the polyol reactant in the reaction step of a foam manufacturing process, i.e., a CPP reactant is reacted with a polyisocyanate reactant in the production of a polyurethane (PU) foam. A typically CPP product can be a stable dispersion of styrene-acrylonitrile (SAN) copolymer particles suspended in a polyether polyol.

Heretofore, known CPP stable dispersion products used as a reactant in a foam-forming process usually have a significant concentration of residual monomers (in particular, e.g., styrene and acrylonitrile monomers) present in the final CPP dispersion product after the CPP is produced. The residual monomers are the unconverted portion of the reactants from a prior dispersion polymerization reaction step carried out in a process to manufacture SAN particles within the polyether polyol. In the process of making SAN particles, typically, the residual monomers are stripped out of the product after the above polymerization reaction step. Typically, the stripping can be done using various stripping agents (e.g., nitrogen, isopropanol, steam, and the like) in a variety of different ways (e.g., batch and continuous systems, a single stage, or multiple stages).

Figure 1:
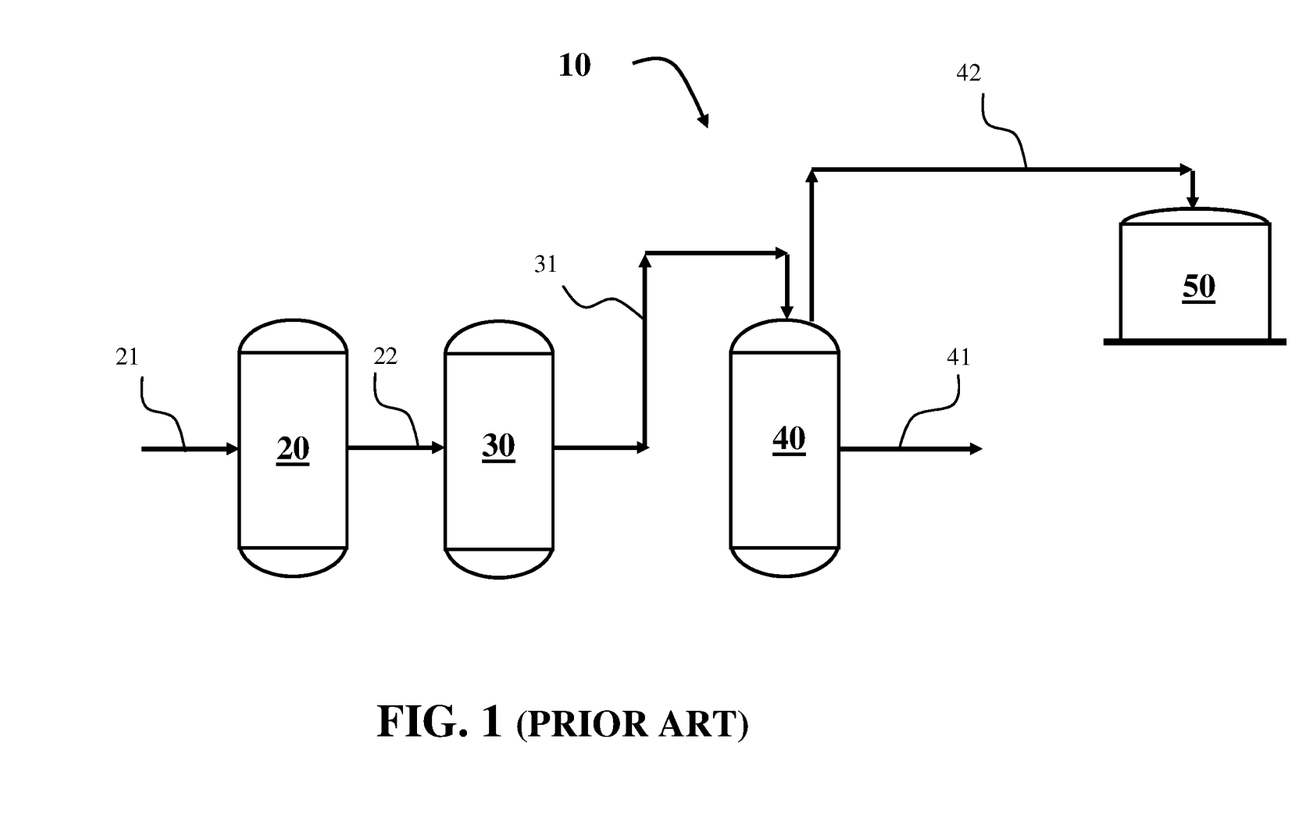
FIG. 1 is a schematic flow diagram of a prior art process for producing a CPP product.

With reference to FIG. 1, there is shown a known general process, generally indicated by reference numeral 10, for producing a CPP product including a first reactor 20, a second reactor 30; a distillation column 40 (e.g., a stripping column 40), and a waste storage vessel 50. In the known process, a monomer feed stream 21 enters the first reactor 20 to partially react the monomers, such as styrene and acrylonitrile present in the feed stream 21; and then the reaction mixture is passed to the second reactor 30 via stream 22. In the second reactor 30, the monomers are further reacted to form a mixture of CPP product and residual monomers and solvent which exits reactor 30 as stream 31. Stream 31 is then passed to the distillation/stripping column 40 to separate (i.e., to strip) any undesired materials such as waste products from the CPP product. The CPP product exits column 40 as product stream 41 and the waste products exit column 40 as waste products stream 42 which is passed to the waste storage vessel 50. One major issue with the known CPP process described above is that there still remains a significant amount of beneficial residual monomers of styrene and acrylonitrile in the waste stream 42. Yet another problem is the significant loss of unreacted monomers and solvent, which is rendered waste. Typically, heretofore, the waste stream 42 has been discarded or sent to a storage unit 50 to await disposal. It would be desirous and advantageous to provide a novel process of removing all, or substantially all, of the residual monomers from the stripped waste stream 42 such that the recovered residual monomers can be recycled back to the monomer feed stream 21 for reuse. Such desirous novel CPP process could be more efficient and less costly than previously known CPP production processes.

Various prior art references have mentioned various methods of partial recovery of monomers and solvent as a mixture. However, using such a mixture as a recycle stream is not possible without additional steps. For example, the removal of unwanted impurities, which would be present in the stripped waste stream, using prior art processes, is not addressed at all. If such impurities are present in a stream that is recycled, the impurities present in the recycled stream can severely affect the quality of the CPP product produced, and in turn, severely affect the quality of the foams made using such CPP.

Another problem that plagues the prior art processes is the difficulty of recovering the acrylonitrile residual monomer because acrylonitrile tends to form a minimum-boiling azeotrope with water and it is very difficult to separate the acrylonitrile monomer from such azeotrope which can form during the CPP production process. None of the prior art references solve the problem of separating water from a minimum-boiling azeotrope of acrylonitrile and water. For example, CN104045773A discloses the use of styrene and acrylonitrile monomers; and the use of isopropyl alcohol (IPA) solvent in a separation and recovery method for solvent during a production process of polymer polyol. The above reference describes recycling a solvent of a certain composition, but the above reference is silent regarding how the solvent is separated from the product and is silent regarding recovery or recycling of monomers.

CN106866893A discloses a method for preparing a high solid content low volatile organic compounds (VOC) polymer polyhydric alcohol; and describes using a recycle vessel for a monomer waste stream. However, the monomer waste stream is not purified before the waste stream is used.

U.S. Pat. No. 2,807,573A discloses purification of acrylonitrile by extractive distillation; and describes purifying mixtures of acrylonitrile and acetonitrile employing a solvent. The solvents mentioned in the above patent include aqueous alkali salts. However, the above patent teaches the separation of acrylonitrile-water azeotrope from a mixture containing acrylonitrile, acetonitrile and water, but does not teach breaking up the azeotrope into the individual components in the azeotrope.

U.S. Pat. No. 3,445,347 discloses extractive distillation of acrylonitrile with withdrawal of a side stream of an impurity stream; and describes using water as an extractive solvent. An acrylonitrile-water azeotrope is collected at the top of a column, but the azeotrope components are not separated out from each other.

An article in International Journal of Chemical and Molecular Engineering, Vol. 9, No. 2, 2015, describes using different entrainer solvents for extractive distillation of acetonitrile (not acrylonitrile). The solvents listed in the above reference include butyl acetate, DMSO, ethylene glycol, DMF, glycerol, and pyridine with preference for glycerol.

An article in Chemical Engineering Research and Design, 99 (2015), pp 125-131, discloses separating ternary mixtures by extractive distillation with 1,2-ethanediol and glycerol; and describes using DMSO and glycerol for extractive distillation of acrylonitrile-water. The aforementioned reference and the other prior art references do not provide a method for separating water from a minimum-boiling azeotrope of acrylonitrile and water. It would be desirous to provide a solution to the above problem.

SUMMARY

The present invention is directed to a process for recovering monomers and solvent present in a waste stream including the steps of: (a) providing a waste feed stream containing monomers, solvent and impurities; (b) subjecting the waste feed stream of step (a) to a separation process under conditions for separating the monomers and solvent from the impurities of the waste stream; (c) recovering the monomers and solvent in one or more streams; and (d) passing the one or more streams of the monomers and solvent from step (c) to further processing.

In one preferred embodiment, the process for recovering monomers present in a waste stream includes the steps of: (a) providing a waste feed stream containing at least one solvent and at least one styrene monomer and at least one acrylonitrile monomer; (b) subjecting the waste feed stream of step (a), or a pre-distilled mixture to extractive distillation, wherein the mixture can include a solvent, at least one monomer such as a styrene monomer, and water as an azeotropic composition; (c) separating the solvent, styrene monomer, and acrylonitrile monomer from the waste feed stream of step (a); and (d) recovering the solvent, styrene monomer, and acrylonitrile monomer in two or more separate streams for recycling, further processing, or storage.

In another embodiment, the solvent, styrene monomer, and acrylonitrile monomer streams, which have been separated and recovered by the process of the present invention, can be used in a process for producing a copolymer polyol, in which, the separation and recovery method of the present invention can be used to produce a greater than (>) 98.5 percent (%) pure stream of either: (1) one of the monomers (e.g., styrene or acrylonitrile), (2) the solvent, or (3) any advantageous combination of the monomers (e.g., styrene and acrylonitrile) in addition to the solvent (e.g., toluene or isopropanol) from the waste stream.

Typically, the waste stream containing the solvent, styrene monomer, and acrylonitrile monomer is collected separately during a known process for producing a CPP product. In the present invention, on the other hand, pure streams of the monomers and of the solvent can be recovered from the generated waste stream; and then the pure streams are recycled back to a reactor used in the CPP production process. The process of the present invention provides a significant reduction in the waste produced in the CPP production process; and a significant reduction in the raw material consumed in the CPP production process.

Styrene and toluene can be easily recovered from the process waste stream with traditional distillation equipment (e.g., batch or continuous distillation). However, water which is present in the waste stream (typically, equal to or less than 1 weight percent [wt %]) forms a minimum-boiling azeotrope with acrylonitrile, making dehydration of acrylonitrile impractical with traditional distillation. In one embodiment of the present invention, the problem of separating water from the minimum-boiling azeotrope of acrylonitrile and water can be solved. For example, in a preferred embodiment, an entrainer can be used to alter the relative volatility of the acrylonitrile-water system, and break up the azeotrope. In another preferred embodiment, glycols, such as tripropylene glycol (TPG), can be used as an entrainer in an extractive distillation sequence, to separate water from a >98.5% pure acrylonitrile stream. Water is not a desired product in a CPP production process; and thus, water is not recycled back to the reactor of the CPP production process. Instead, because the water accumulates in the system if recycled, the water is desirably removed from the present invention process.

Pervaporation or adsorption are alternative methods which could be used to separate water and an acrylonitrile stream. However, the high reactivity of acrylonitrile limits the compatible membranes or adsorbent materials that can be used in the above alternative methods. In addition, the high reactivity and toxicity of acrylonitrile makes pervaporation very expensive and difficult to handle; and the membranes used in the pervaporation method have a high turnover rate. A glycol, such as TPG, is a relatively inexpensive solvent and has the desirable and required properties for water removal from an acrylonitrile-water azeotropic stream. Using a glycol such as TPG in an extractive distillation sequence can advantageously result in a >98.5% pure acrylonitrile stream.

DETAILED DESCRIPTION

A copolymer polyol (CPP) reactant product is a stable dispersion of styrene-acrylonitrile (SAN) copolymer particles suspended in a polyether polyol. During the production process of producing the CPP reactant product, a waste stream from a SAN-CPP stripping step is produced. The waste stream can contain, for example, acrylonitrile, styrene, toluene, ethylbenzene, water, and other heavy impurities. In one broad embodiment, the present invention includes a process for separating the aforementioned monomers such as acrylonitrile and styrene from the waste stream and recycling the monomers back to the CPP production process for reuse.

Figure 2:
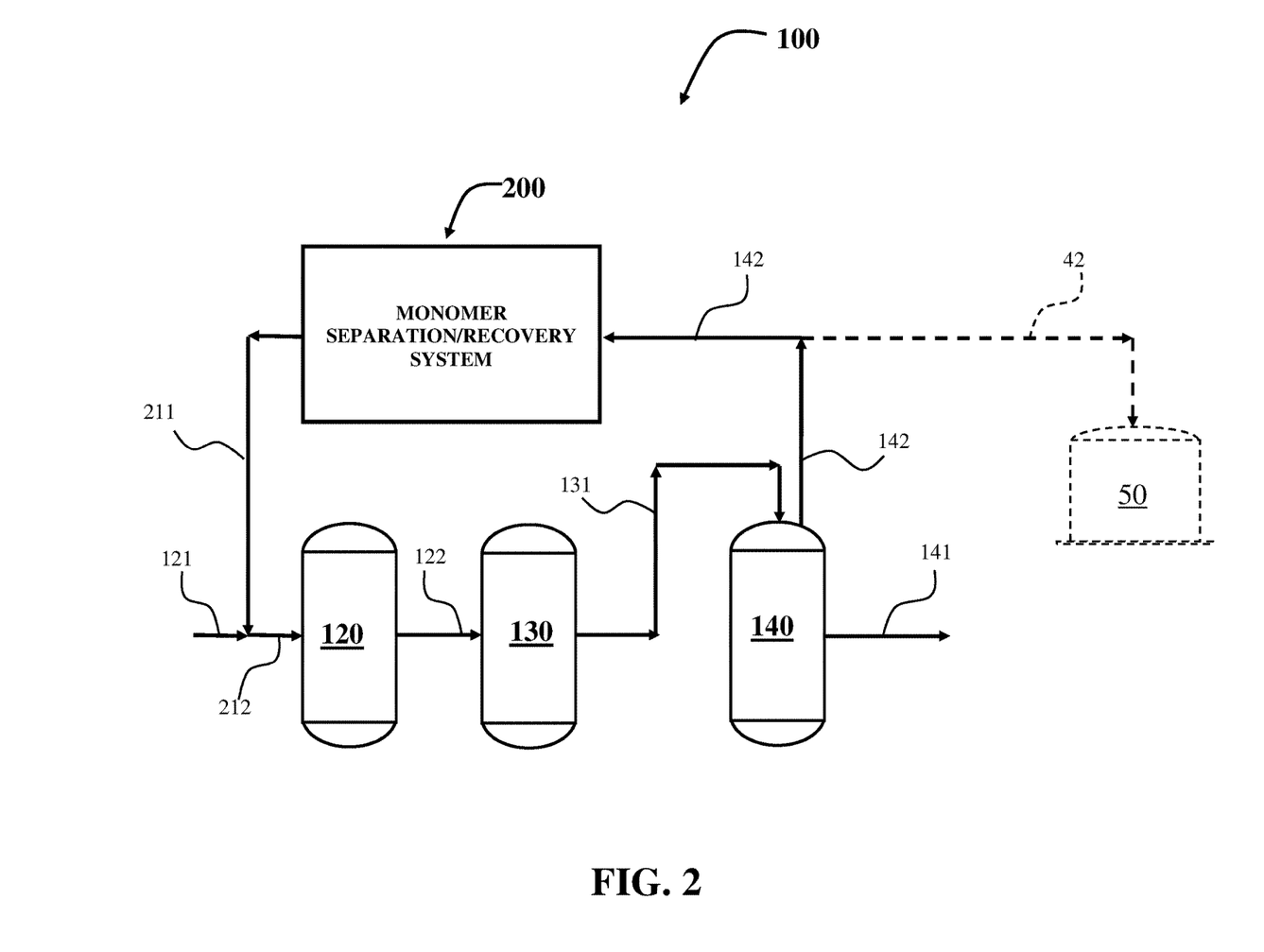
FIG. 2 is a schematic flow diagram of a process of the present invention for producing a CPP product.

With reference to FIG. 2, there is shown a process of the present invention, generally indicated with reference numeral 100, for producing a CPP product which differs significantly from prior art process in that instead of discarding a waste stream (generated in the process of producing the CPP product) containing residual monomers and solvent, the waste stream is processed further to separate and recover the residual monomers and solvent for reusing (recycling) the monomers in the CPP process. The process of the present invention advantageously is efficient and saves the costs associated with the residual monomers and solvent used in the CPP production process.

With reference to FIG. 2 again, there is shown a CPP production process 100 includes a monomer separation and recovery system or scheme for separating and recovering one or more monomers, generally indicated by reference numeral 200, wherein a monomer(s) stream and solvent 211 exiting from the recovery process 200 can be recycled back to the feed stream 121 of the CPP process. For example, stream 211 can be combined with feed stream 121 to form feed stream 212 passed to the first reactor 120. The exit stream 122 from the first reactor 120 passes to a second reactor 130. From the second reactor 130, an output stream 131 passes to a distillation column 140. In the distillation column 140, a CPP product stream 141 is separated from a waste stream 142 which passes to the recovery process 200 for separating the residual monomers in the waste feed stream 142 into one or more monomer streams 211 that can be recycled to the CPP feed stream 121. The monomer separation and recovery system 200 shown in FIG. 2 can include various systems and examples of some preferred embodiments of such systems are described in more detail herein below.

Figure 3:
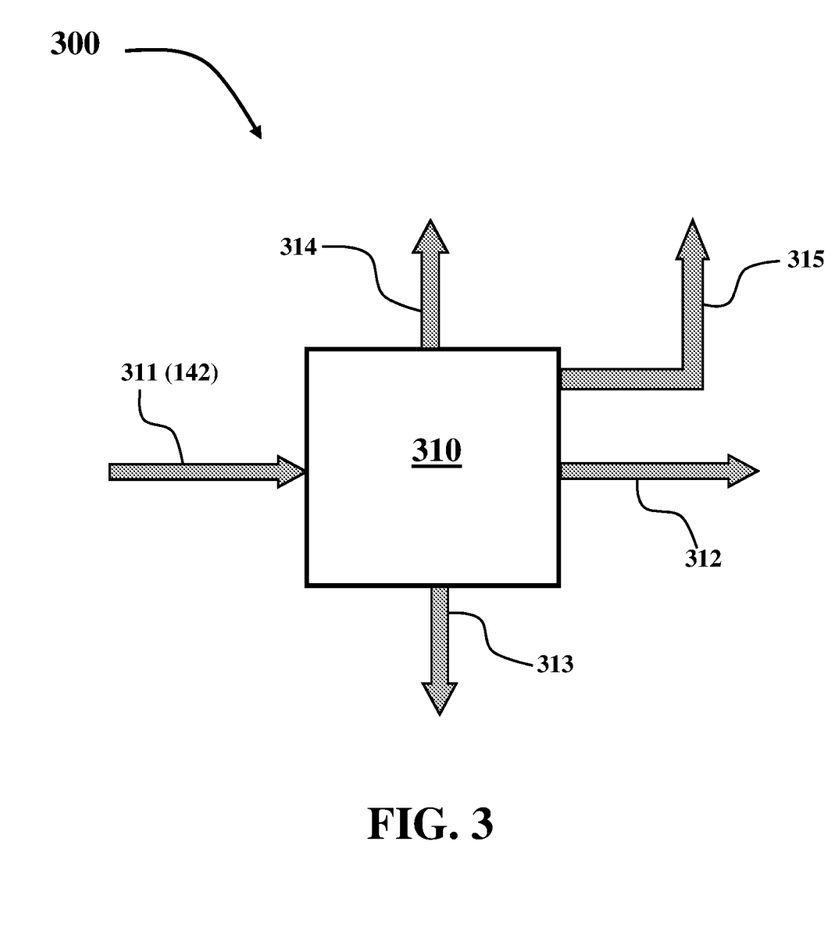
FIG. 3 is a schematic flow diagram of a process of the present invention for separating and recovering residual monomers and solvent from a waste stream.

With reference to FIG. 3, there is shown a schematic flow chart of one broad embodiment of a process of the present invention, generally indicated with reference numeral 300, for separating monomers such as acrylonitrile and styrene from a waste stream. The process of the present invention 300 can include, for example, several distillation operations not found in prior art processes such as a novel extractive distillation operation. In general, process 300 can include one or more columns; process steps; or operational schemes, generally indicated by reference numeral 310. For example, a feed waste stream 311 can be passed to one or more distillation columns 310 wherein a product stream of one or more monomers and solvent stream 312 exits the column(s) 310. In addition, one or more waste streams such as a heavies stream 313, an overheads stream 314 and a side stream 315 can exit column(s) 310. "Heavies" herein, with reference to a flow stream of the process, means a stream with one or more impurities each having a boiling point above 150 degrees Celsius (° C.). Each of the streams 313, 314 and 315 can include one or more columns; one or more process steps; or one or more operational schemes to further separate desired monomers and solvent from waste streams.

Figure 4:
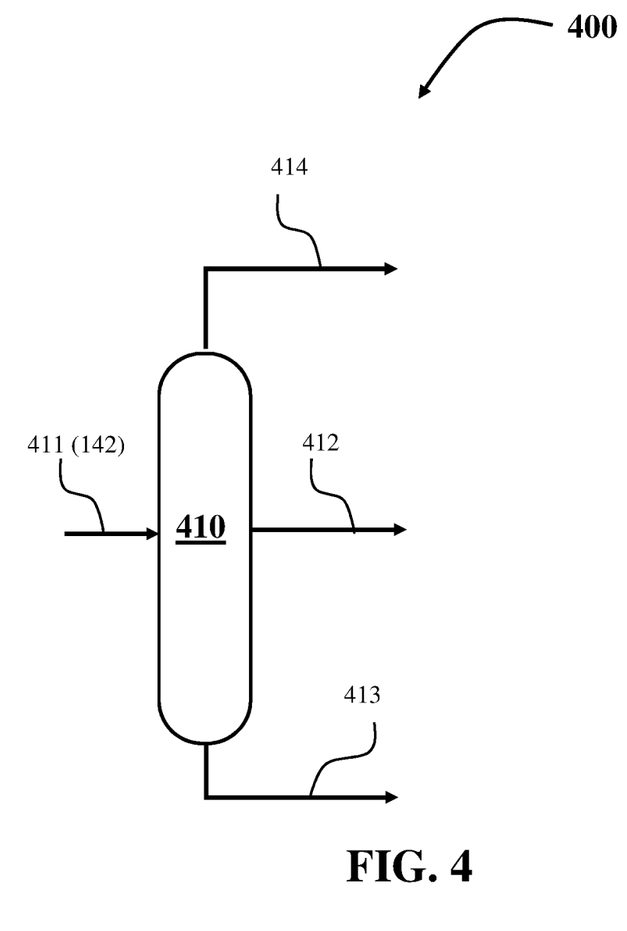
FIG. 4 is a schematic flow diagram of one embodiment of a process of the present invention for separating and recovering residual monomers and solvent from a waste stream.

With reference to FIG. 4, there is shown a schematic flow chart of one embodiment of a process of the present invention, generally indicated with reference numeral 400, for separating and recovering residual monomers and solvent from a waste stream. In the embodiment shown in FIG. 4, the process 400 includes a distillation column 410. In the process 400, a waste stream 411 is fed to the column 410 wherein a mixture of residual monomers and solvent contained in the waste stream is separated from other undesired waste products in the waste stream; and the mixture of monomers and solvent exits the column 410 via a mixed monomer/solvent stream 412. The mixture of residual monomers and solvent contained in the mixed monomer/solvent stream 412 may include, for example, styrene monomer, acrylonitrile monomer, and solvent such as toluene. The mixed monomer/solvent stream 412 can then be recovered and recycled back to the monomer feed stream 121 of the CPP product production process 100 (shown in FIG. 2). A bottoms stream 413 from column 410 can be forwarded to a further processing operation, storage, or discarded. A top overheads stream 414 from column 410 can be forwarded to a further processing operation, storage, or discarded.

In one embodiment of the process shown in FIG. 4, the mixture of monomers and solvent exiting the column 410 via the mixed stream of monomers and solvents stream 412 can include, for example from 50 wt % to 65 wt % solvent; 20 wt % to 30 wt % styrene; 15 wt % to 20 wt % acrylonitrile; and less than 1 wt % of a combination of water, ethylbenzene, and heavies.

Figure 5:
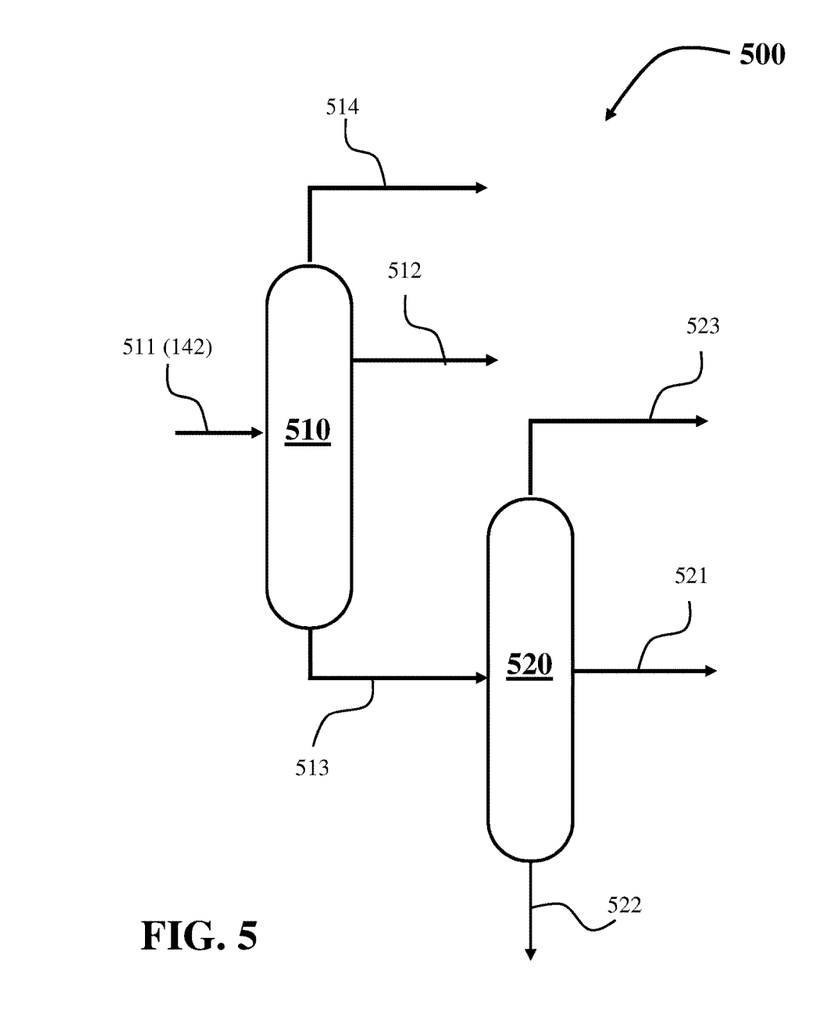
FIG. 5 is a schematic flow diagram of still another embodiment of a process of the present invention for separating and recovering residual monomers and solvent from a waste stream.

With reference to FIG. 5, there is shown a schematic flow chart of another embodiment of a process of the present invention, generally indicated with reference numeral 500, for separating and recovering residual monomers from a waste stream. In the embodiment shown in FIG. 5, the process 500 includes a first distillation column 510 and a second distillation column 520. The process 500 can be used for separating and recovering styrene monomer which can then be recycled back to the monomer feed stream 121 of the CPP product production process 100 (shown in FIG. 2). In the process 500, a waste stream 511 is fed to the first column 510 wherein the waste feed stream 511 is separated into three streams: (1) a solvent side stream 512 such as toluene; (2) a bottoms stream 513 containing styrene; and (3) an overheads stream 514 comprising predominantly of an azeotrope of acrylonitrile and water. The bottoms stream 513 from column 510 is passed as a feed stream 513 to the second distillation column 520 wherein the bottoms feed stream 513 is separated into another three streams: (1) a styrene monomer side stream 521; (2) a bottoms stream 522 which can be a waste stream; and (3) a top overheads stream 523 comprising ethylbenzene which can also be considered a waste stream for the present invention process. The styrene monomer stream 521 exiting column 520 can then be recovered and recycled back to the monomer feed stream 121 of the CPP product production process 100 (shown in FIG. 2). The toluene solvent side stream 512 from the column 510 may be passed on storage or recycled back to the CPP process.

Figure 6:
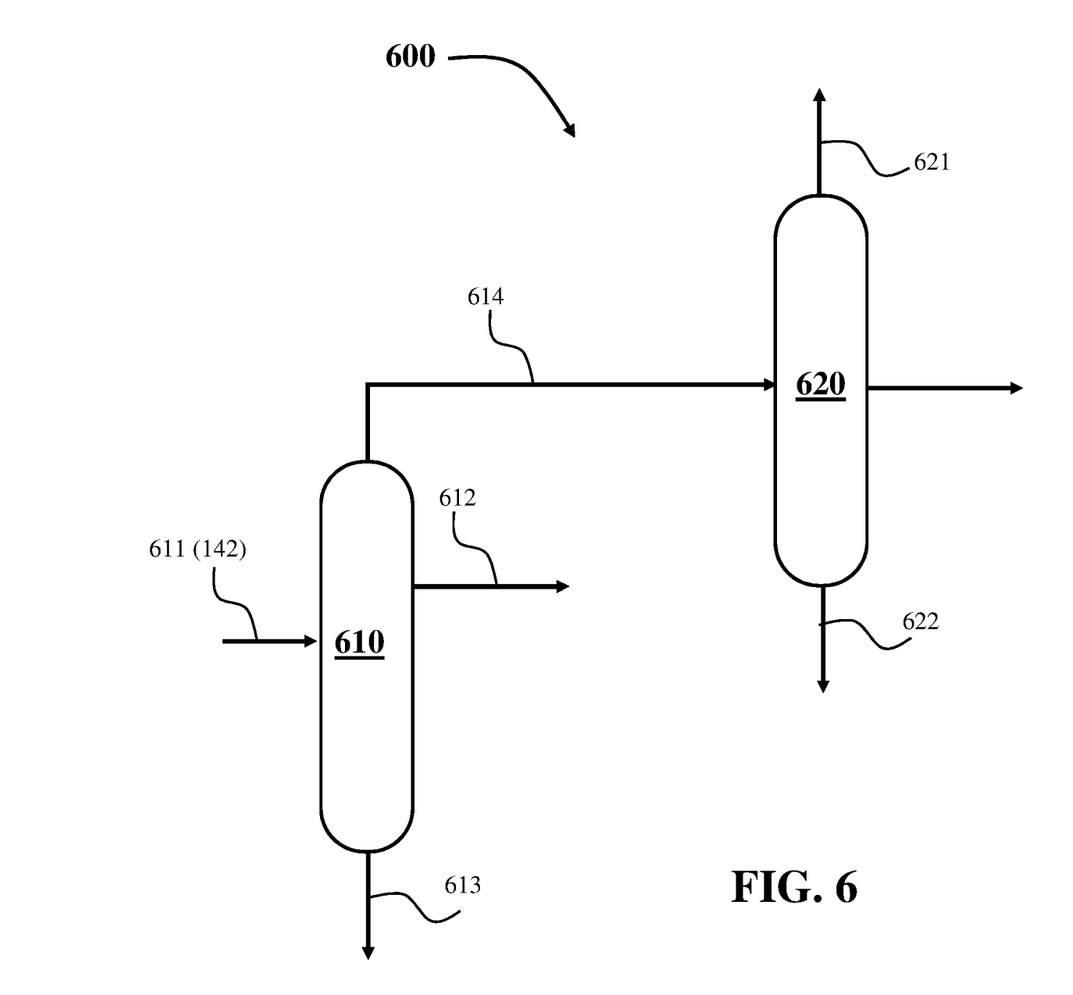
FIG. 6 is a schematic flow diagram of yet another embodiment of a process of the present invention for separating and recovering residual monomers and solvent from a waste stream.

With reference to FIG. 6, there is shown a schematic flow chart of still another embodiment of a process of the present invention, generally indicated with reference numeral 600, for separating and recovering residual monomers from a waste stream. In the embodiment shown in FIG. 6, the process 600 includes a first distillation column 610 and a second conventional distillation column 620. In the process 600, a waste stream 611 is fed to the first column 610 wherein the waste feed stream 611 is separated into three streams: (1) a styrene monomer side stream 612 which can be recycled back to the CPP production process 100; (2) a bottoms stream 613; and (3) a top overheads stream 614 comprising a mixture of compounds including acrylonitrile and water. The overheads stream 614 from column 610 is passed as a feed stream 614 to the second distillation column 620 wherein the top overheads feed stream 614 is further separated into another three streams: (1) a stream 621 which is predominantly composed of acrylonitrile and water, and which can contain toluene; (2) a bottoms stream 622 which can be a waste stream mainly composed of ethylbenzene and which can contain toluene; (3) a side stream 623, which is predominantly toluene and which can be passed on to storage or recycled back to the CPP production process 100.

Figure 7:
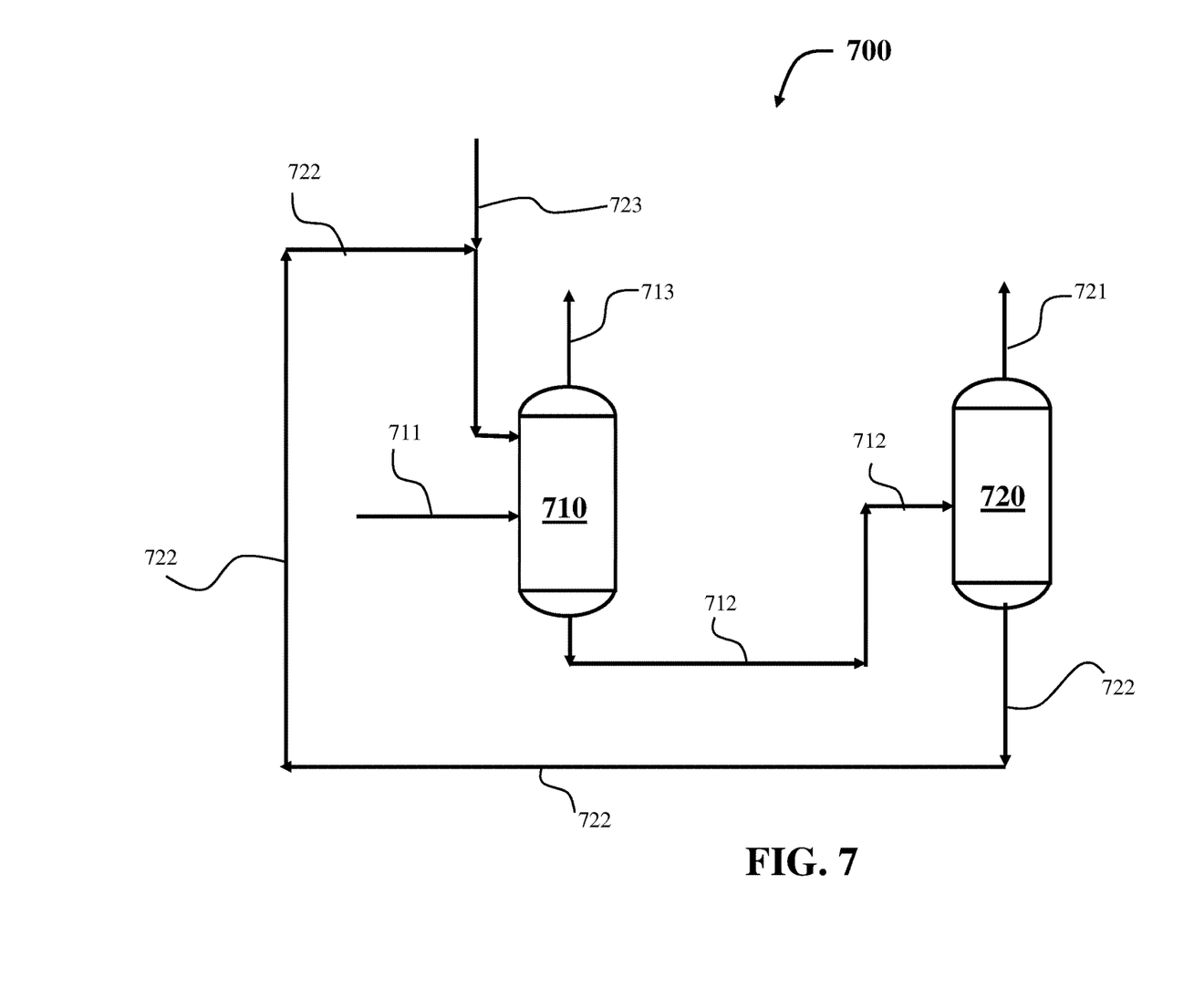
FIG. 7 is a schematic flow diagram of an extractive distillation process of the present invention for separating and recovering residual monomers and solvent from a waste stream.

With reference to FIG. 7, there is shown a schematic flow chart of yet another embodiment of a process of the present invention, generally indicated with reference numeral 700, for separating and recovering residual monomers from a waste stream. In the embodiment shown in FIG. 7, the process system 700 includes an extractive distillation column 710 and a separation distillation column 720. The process 700 can be used for separating and recovering the acrylonitrile monomer from an azeotrope of acrylonitrile and water which has been difficult to carry out with prior art processes. The recovered acrylonitrile monomer can then be recycled back to the monomer feed stream 121 of the CPP product production process 100 (shown in FIG. 2). In the process 700, a feed stream 711 comprising an azeotrope of acrylonitrile and water is fed into the extractive distillation column 710 into which an extractive distillation solvent (shown by stream 722) is also fed, wherein a bottoms stream 712 exits the column 710 and a top overheads purified stream of acrylonitrile 713 exits the column 710 near the top of the column. The bottoms stream 712 exiting the column 710 contains water and other products such as extraction solvent. In the preferred embodiment shown in FIG. 7, the bottoms stream 712 can be fed into a separation column 720 wherein the water (which is an undesired product) contained in the feed stream 712 can be separated from the desired extraction solvent. The water stream 721 exits the column 720 near the top of the column 720; and the bottoms stream 722 exiting the column 720 can be recycled back to the extractive distillation column 710 via stream 722.

In other embodiments, the extractive distillation scheme 700 shown in FIG. 7 can be used in combination with scheme 500 shown in FIG. 5 in one embodiment or with scheme 600 shown in FIG. 6 in another embodiment. For example, if scheme 700 is used in combination with scheme 500, stream 514 will be the feed stream (711) to column 710, which is also discussed below as feed stream 814 in separation scheme 800 shown in FIG. 8. If scheme 700 is used in combination with scheme 600, stream 621 will be the feed stream (711) to column 710.

Figure 8:
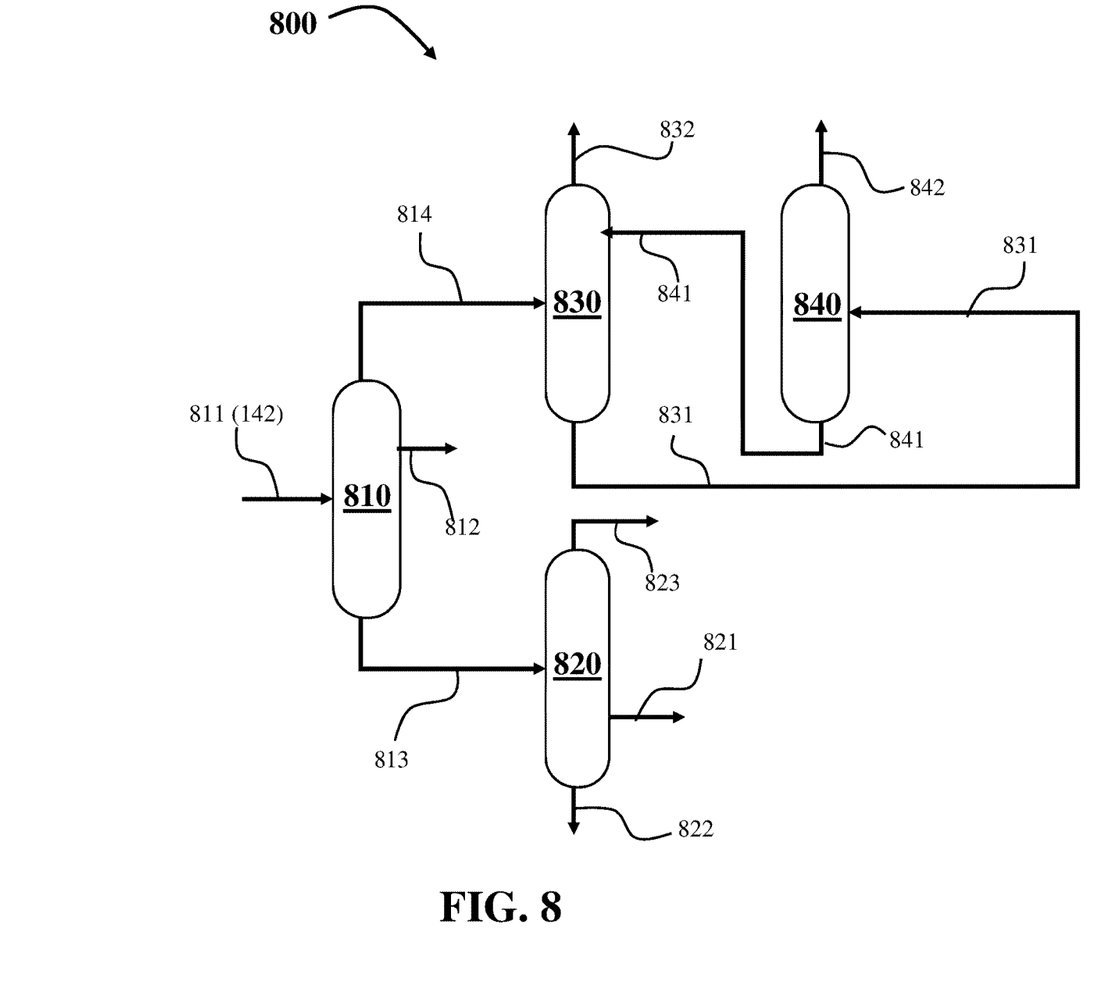
FIG. 8 is a schematic flow diagram showing an overall process of the present invention for separating and recovering various residual monomers and solvent from a waste feed stream.

With reference to FIG. 8, there is shown a schematic flow chart of one general embodiment of a process of the present invention, generally indicated with reference numeral 800, for separating and recovering residual monomers and solvent from a waste stream. In the embodiment shown in FIG. 8, the process system 800 is a combination of several operations for separating and recovering several monomers and solvent. The process 800 includes, for example, a first distillation column 810, a second distillation column 820, an extractive distillation column 830 and a separation distillation column 840. The process 800 can be used for separating and recovering, for example, the styrene monomer, the acrylonitrile monomer from an azeotrope of acrylonitrile and water, and the solvent such as toluene. In the general embodiment shown in FIG. 8. Each of the columns 810, 820, 830, and 840 can each have one or more feed streams and one or more discharge streams. In addition, each of the columns 810, 820, 830, and 840 can include a condenser (not shown) incorporated into the process scheme shown in FIG. 8 after the top overheads stream to form an overheads output stream; and each of the columns 810, 820, 830, and 840 can include a reboiler (not shown) incorporated into the process scheme shown in FIG. 8 after the bottoms stream to form a bottoms or heavies output stream.

With reference to FIG. 8 again, a waste feed stream 811 is fed into the first distillation column 810 to separate the waste stream 811 into three streams: (1) an overheads stream 814; (2) a side-stream 812 of solvent, such as toluene; and (3) a bottoms stream 813. The overheads stream 814 passes from the first distillation column 810 on to further processing in the extractive distillation column 830 (described herein below). The side stream 812 passes from the column 810 on to storage or recycled back to the process 100. The bottoms stream 813 passes from the column 810 on to further processing in the second distillation column 820.

In carrying out the first distillation in column 810, the reboiler temperature of the distillation can be from 50° C. to 90° C. in one embodiment; from 60° C. to 75° C. in another embodiment, and from 60° C. to 65° C. in still another embodiment. The reboiler pressure in column 810 can be from 0.5 pounds/square inch (psi) (3.4 kPa [kiloPascals]) to 5 psi (34.4 kPa) in one embodiment, from 0.5 psi (3.4 kPa) to 2 psi (13.8 kPa) in another embodiment, and from 0.7 psi to (4.8 kPa) 1.1 psi (7.6 kPa) in still another embodiment.

With reference to FIG. 8 again, the bottoms stream 813 from the column 810 is fed, as a feed stream 813, to the second distillation column 820 to separate the bottoms stream 813 into three streams: (1) an overheads stream 823; (b2) a side-stream 821 of styrene; and (3) a bottoms stream 822. The overheads stream 823 contains impurities not wanted in the CPP process and hence, the overheads stream 823 can be discarded. Additional processing of stream 823 can be done, however such processing would not be practical for the recovery of relatively small amounts of valuable components. The side stream 821 of styrene monomer passes from the column 820 on to a recovery and recycling process or storage. The bottoms stream 822 also contains impurities not wanted in the CPP process and hence, the bottoms stream 822 can be discarded.

In carrying out the second distillation in column 820, the reboiler temperature of the distillation can be from 40° C. to 85° C. in one embodiment; from 55° C. to 75° C. in another embodiment, and from 65° C. to 70° C. in still another embodiment. Above the temperature of 85° C., fouling may be a major issue and below the temperature of 40° C., the temperature in the condenser may be negative, and the presence of water may cause issues like ice, or hydrate formation. The reboiler pressure in column 820 can be from 0.4 psi (2.8 kPa) to 4 psi (27.6 kPa) in one embodiment, from 0.4 psi (2.8 kPa) to 2 psi (13.8 kPa) in another embodiment, and from 0.6 psi (4.1 kPa) to 0.9 psi (6.2 kPa) in still another embodiment.

With reference to FIG. 8 again, the overheads stream 814 from the first distillation column 810 is used as a feed stream 814 and fed into the extractive distillation column 830 to separate the feed stream 814 into two streams: (1) an overheads stream 832 of acrylonitrile; and (2) a bottoms stream 831 of a mixture of extractive distillation solvent and water.

The overheads stream 832 of acrylonitrile passes from the column 830 on to a recovery and recycling process or storage. The bottoms mixture stream 831 passes from the column 830 on to further processing in the separation distillation column 840.

In an extractive distillation operation, such as occurring in the distillation column 830, the extraction solvent used in the extractive distillation scheme, can include, for example, polar solvents with a high affinity for water such as tripropylene glycol (TPG); methyl propylene glycol (MPG); dipropylene glycol (DPG), ethylene glycol; other products from a glycol ether family such as a dipropylene glycol monomethyl ether, propylene glycol methyl ether, and the like; and mixtures thereof.

In carrying out the extractive distillation in column 830, the reboiler temperature of the extraction can be from 45° C. to 75° C. in one embodiment; from 50° C. to 60° C. in another embodiment, and from 50° C. to 55° C. in still another embodiment. The pressure in column 830 can be from 0.8 psi (5.5 kPa) to 10 psi (68.9 kPa) in one embodiment, from 1 psi (6.9 kPa) to 5 psi (34.4 kPa) in another embodiment, and from 1.1 psi (7.6 kPa) to 1.9 psi (13.1 kPa) in still another embodiment for the extraction to be the most economical operation. Above the aforementioned temperature of 75° C. and pressure of 68.9 kPa, fouling due to autopolymerization of styrene, acrylonitrile, or its combination can be an issue. Below the aforementioned temperature of 45° C. and pressure of 5.5 kPa, additional refrigeration cost and vacuum cost would have to be considered.

In other embodiments as alternatives and as a substitute for the operation in the extractive distillation column 830, the solvent and monomers can be separated from the waste stream and from the water using, for example, membrane separation, including vapor permeation and pervaporation; adsorption on a suitable adsorbent such as a molecular sieve; and other like operations or separation methods (not shown).

With reference to FIG. 8 again, the bottoms mixture stream 831 from the column 830 is used as feed stream 831 to the separation distillation column 840 to separate the feed stream 831 into two streams: (1) an overheads stream 842 of water; and (2) a bottoms stream 841 of the extractive distillation solvent. The overheads stream 842 of water passes from the column 840 on to a waste water treatment process and equipment. The bottoms solvent stream 841 can be recovered and recycled back to the extractive distillation column 830 as shown in FIG. 8 or passed on to storage.

In carrying out the separation distillation in column 840, the reboiler temperature of the distillation can be from 150° C. to 250° C. in one embodiment; from 175° C. to 235° C. in another embodiment, and from 200° C. to 210° C. in still another embodiment. The reboiler pressure in column 840 can be from 5 psi (34.5 kPa) to 55 psi (379.2 kPa) in one embodiment, from 20 psi (137.9 kPa) to 50 psi (344.7 kPa) in another embodiment, and from 40 psi (275.8 kPa) to 50 psi (344.7 kPa) in still another embodiment.

In some embodiments of the process of the present invention, for example, as described above, generally the waste stream can contain an initial content of solvent of from 20 wt % to 60 wt %; an initial content of styrene monomer of from 10 wt % to 50 wt %; an initial content of acrylonitrile monomer of from 5 wt % to 35 wt %; an initial concentration of ethylbenzene of from 0 wt % to 5 wt %, an initial content of water of from 0 wt % to 5 wt %, and an initial content of heavies of from 0 wt % to 5 wt %. Then, after separating the solvent, styrene monomer, acrylonitrile monomer, from the waste feed stream, in a preferred embodiment the waste stream can contain a reduced content of solvent of 0 wt % to 30 wt %; a reduced content of styrene monomer of 0 wt % to 85 wt %; a reduced content of acrylonitrile monomer of 0 wt % to 20 wt %; and a reduced content of water of 0 wt % to 5 wt % and a reduced content of undesired heavies in the range of 0 wt % to 10 wt %.

In other embodiments, the process of the present invention can be carried out to advantageously remove an optimum amount useful monomers and solvent. For example, in one embodiment, at least 30% of the solvent in the waste stream can be removed from the waste stream; at least 10% of the styrene monomer in the waste stream can be removed from the waste stream; at least 10% of the acrylonitrile monomer in the waste stream can be removed from the waste stream; and at least 90% of the water in the waste stream can be removed from the waste stream.

The resulting monomers and solvent removed from the waste stream include streams that can be substantially purified once recovered from the waste stream. For example, in one embodiment, the solvent stream removed from the waste stream can have a purity of at least 90%; the styrene monomer stream removed from the waste stream can have a purity of at least 98%; the acrylonitrile monomer stream removed from the waste stream can have a purity of at least 90%.

With reference to FIG. 2 again, once the monomers and solvent (e.g., acrylonitrile, styrene, toluene, ethylbenzene and water) are separated as a recycle stream 211 from the waste stream 142, in a preferred embodiment, the monomers and solvent can be recycled back, via stream 211, to a single reactor or a series of two or more reactors such as reactor columns 120 and 130 shown in FIG. 2, for reuse in preparing a CPP product. In another embodiment, the monomers and solvent streams can be passed to other equipment for further processing, or to a storage tank(s) for storage and later use.

The copolymer polyol (CPP) (also referred to as a "modified polyol" or a "polymer polyol" or a "graft polyol") produced using the monomers and solvent recovered from a waste stream in accordance with the present invention can be a blend or admixture of polyol compounds. Such CPP compounds have been fully described in the prior art and an example of a process for manufacturing a CPP product, for example, is described in U.S. Pat. Nos. 4,513,124; 4,588,830; 4,640,935; 5,854,386; 4,745,153; 5,081,180; and 6,613,827; and in EP 1 675 885. In general, the methods described in the above references include dispersing low molecular monomer(s) in the form of droplets in a polyol and in the presence of a stabilizer, and subjecting the dispersed monomer droplets to polymerization conditions until the monomer droplets are converted to solid polymer particles dispersed in a continuous polyol phase.

For example, a CPP product can be obtained by the in situ polymerization of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol. In one preferred embodiment, the CPP products can include products obtained by in situ polymerization of styrene and/or acrylonitrile in polyoxyethylene polyoxypropylene polyols and/or products obtained by in situ reaction between a polyisocyanate and an amino or hydroxy-functional compound (such as triethanolamine) in a polyoxyethylene polyoxypropylene polyol.

Stability is an important characteristic of polymer polyols. The dispersed phase must remain distributed within the polyol phase for extended periods as the polymer polyol is stored, transported and used. In addition, polymer polyol products often experience large swings in temperature during storage and transportation, and must remain stable across the entire temperature range. If the dispersion is unstable, some or all of the dispersed polymer phase can settle out. This leads to fouling of transportation, storage and processing equipment, inconsistencies in the polymer polyol product and inconsistencies in polyurethanes made from the polymer polyol.

Stability is improved through the use of stabilizers. The stabilizer contains polyol-soluble groups, typically polyether chains which can have molecular weights up to several thousand. The stabilizer resides at the surface of the dispersed polymer particles, where the polyol-soluble groups are believed to stabilize the particles through the interaction of these polyol-soluble groups with the continuous polyol phase. One common type of stabilizer is a "macromer" compound, typically a polyether polyol, in which one or more of the hydroxyl groups are capped with a group that contains polymerizable unsaturation. This type of stabilizer copolymerizes with styrene and acrylonitrile, and in doing so introduces polyol-soluble moieties onto the copolymer particles. In some cases, the macromer is partially homopolymerized or copolymerized with a small amount of one or more other monomers to form a preformed stabilizer. Examples of macromers and preformed stabilizers of this type are described, for example, in U.S. Pat. Nos. 4,513,124; 4,588,830; 4,640,935; 4,745,153; 4,997,957; 5,081,180; 5,196,476; 5,854,386; 5,990,185; 6,013,731; 6,613,827; 7,160,975; 7,179,882; 7,759,427; and 7,776,969; U.S. Patent Application Publications Nos. US 2004-0266958, US 2005-0085613, US 2007-0060690, and US2009-0281206; EP 0 786 480; EP 1,675,885; and WO 2009/155427.

Polyether polyols include, for example, polymers of propylene oxide, ethylene oxide, 1,2-butylene oxide, tetramethylene oxide, block and/or random copolymers thereof, and the like. The polyether polyols may contain low levels of terminal unsaturation (for example less than 0.02 meq/g or less than 0.01 meq/g). Examples of such low unsaturation polyether polyols include those made using so-called double metal cyanide (DMC) catalysts as described for example in U.S. Pat. Nos. 3,278,457; 3,278,458; 3,278,459; 3,404,109; 3,427,256; 3,327,334; and 3,427,335.

Various other ingredients may be present during the polymer polyol production process, in addition to the polyol(s), low molecular weight monomer(s) and stabilizer(s). A polymerization catalyst preferably is present. The polymerization catalyst preferably is a free radical initiator that generates free radicals under the conditions of the polymerization process. Examples of suitable free-radical initiators include peroxy compounds such as peroxides, persulfates, perborates, percarbonates, azo compounds and the like. Specific examples of free-radical initiators include hydrogen peroxide; di(decanoyl)peroxide; dilauroyl peroxide; t-butyl perneodecanoate; 1,1-dimethyl-3-hydroxybutyl peroxide-2-ethyl hexanoate; di(t-butyl)peroxide; t-butylperoxydiethyl acetate; t-butyl peroctoate; t-butyl peroxy isobutyrate; t-butyl peroxy-3,5,5-trimethyl hexanoate; t-butyl perbenzoate; t-butyl peroxy pivulate; t-amyl peroxy pivalate; t-butyl peroxy-2-ethyl hexanoate; lauroyl peroxide; cumene hydroperoxide; t-butyl hydroperoxide; azo bis(isobutyronitrile); 2,2'-azo bis(2-methylbutyronitrile); and the like. Two or more catalysts may be used. The amount of catalyst may range from 0.01 percent by weight (wt %) to 5 wt %, preferably 0.01 wt % to 3 wt %, based on the weight of the low molecular weight monomer(s).

A molecular weight regulator, such as a chain transfer agent is another useful ingredient. Examples of these include low molecular weight aliphatic alcohols such as isopropanol, ethanol, t-butanol, toluene, ethylbenzene, trimethylamine, mercaptans such as dodecylmercaptane and octadecylmercaptane and chlorinate alkanes such as carbon tetrachloride, chloroform, methylene chloride; and the like. These chain transfer agents are typically present (if used at all) in amounts ranging from 0.01 wt % to 3 wt %, preferably 0.25 wt % to 2 wt %, based on the weight of low molecular weight monomers.

The polymerization can be performed continuously, or in various batch and semi-batch processes. A continuous process is characterized by the continuous introduction of polyol(s), stabilizer, and low molecular weight monomers into the polymerization, and continuous withdrawal of product. In a semi-batch process, at least a portion of the low molecular weight monomers is continuously or intermittently introduced into the polymerization, but product is not continuously withdrawn, preferably not being removed until the polymerization is completed. In the semi-batch process, some or all of the polyol(s) and/or stabilizer may be added continuously or intermittently during the process, but the entire amounts of those materials may instead be charged to the polymerization apparatus prior to the start of the polymerization. In a batch process, all polyol(s), stabilizer(s) and low molecular weight monomers are charged at the beginning of the polymerization, and product is not removed until the polymerization is completed.

The CPP reactant product produced as described above can be used further to produce a polyurethane foam-forming reaction mixture composition including the step of admixing the above CPP reactant product with an isocyanate reactant product. The reaction mixture, in turn, is used in a process for producing a polyurethane foam article by reaction schemes well known those in the foam producing art. For example, in preparing a flexible polyurethane foam article or product, an A-side material and a B-side material is first prepared. Then the A-side material and B-side material are mixed together to form the polyurethane foam-forming reaction mixture. The reactive blend is then subjected to conditions sufficient to cure the reactive blend to form a flexible polyurethane foam. The A-side material can include at least one isocyanate-containing material (e.g., 2,4- and/or 2,6-toluene diisocyanate (TDI), diphenylmethane-diisocyanate (MDI), and various isomers or derivatives of MDI); and the B-side can include at least one of the CPP products described above.

In general, the CPP reactant product can include, for example, products obtained by the in situ polymerization of one or more vinyl monomers (e.g., styrene and acrylonitrile, in polymeric polyols, for example polyether polyols, or by the in situ reaction between a polyisocyanate and an amino- or hydroxy-functional compound, such as triethanolamine, in a polymeric polyol. In a preferred embodiment, the CPP reactant product can include products obtained by in situ polymerization of styrene and/or acrylonitrile in polyoxyethylene polyoxypropylene polyols and products obtained by in situ reaction between a polyisocyanate and an amino or hydroxy-functional compound (such as triethanolamine) in a polyoxyethylene polyoxypropylene polyol.

Other optional additives or compounds can be added to the A-side material, to the B-side material, or to both the A-side material and the B-side material. For example, the optional compounds can include at least one crosslinker; at least one reactive catalyst; at least one surfactant; a medium such as water; and mixtures thereof.

Any of the known blowing agents conventionally used in the production of polyurethane foams can also be used. Suitable blowing agents include water, halogenated hydrocarbon of low molecular weight, carbon dioxide and low boiling hydrocarbons. The blowing agents are used in amounts well known to those skilled persons in the field of making foams.

In addition to the above-mentioned materials, any number of variety of additives conventionally used in the production of polyurethane foams such as, for example, fire retardants, defoamers, antioxidants, mold release agents, dyes, pigments, and fillers can also be used in the process of the present invention. The above-described additives are used in amounts well known to those skilled persons in the field of making foams.

The flexible polyurethane foam prepared from the polyurethane foam-forming reaction mixture composition described above can be formed into a foam article or product using molding processes known to those skilled in the art.

The foam-forming composition and foams produced from such composition can be used in various applications including for example in a variety of packaging, seating, and other cushioning applications, such as mattresses, furniture cushions, automotive seating, bumper pads, sport and medical equipment, helmet liners, pilot seats, earplugs, and various other applications.

EXAMPLES

The following examples, designated as either Inventive Examples (Inv. Ex.) or Comparative Examples (Comp. Ex.), are presented to further illustrate the present invention in detail but are not to be construed as limiting the scope of the claims. Unless otherwise indicated, all parts and percentages are by weight.

Example 1—Monomer and Solvent Separation Using Extractive Distillation

In an acrylonitrile-styrene CPP plant, typically the components stripped out from the CPP are collected in a waste tank and disposed-off. The waste stream disposal operation alone across manufacturing plants can be costly. Therefore, recovering the monomers for recycle would be advantageous to the industry.

This Example 1 is a simulation example simulating a waste stream containing various monomer and solvent components being processed through a separation and recovery system process shown in FIG. 8. The waste stream composition is described in Table I. A schematic process flowsheet shown in FIG. 8 is used to separate the monomers (acrylonitrile, styrene) and solvent (toluene) from a waste stream. The recovered monomers and solvent components are recycled back to the reaction system of a CPP production process (see FIG. 2); and the unwanted impurities are separated and disposed-off. In this simulation Example 1, the purity of each of the recovered streams is >98% and the recoveries are >95%, except for styrene, for which the recovery is approximately (~) 86%.

TABLE I

| Stream Compositions and Flow Rates (Streams are Designations from FIG. 8) | | | | | | | |
|---|---|---|---|---|---|---|---|
| | | \multicolumn{6}{c}{Stream Name and Number of FIG. 8} | | | | | | |
| Property | Unit | FEED 811 | ACN1 814 | TOL 812 | HEA1 813 | EB-TOL 823 | STY 821 |
| Temperature | °C. | 35 | 23.87 | 51.85 | 85.07 | 64.89 | 77.94 |
| Pressure | bar | 1.5 | 0.14 | 0.15 | 0.16 | 0.10 | 0.11 |
| Mass Density | kg/m$^3$ | 866.93 | 813.65 | 839.87 | 844.83 | 852.95 | 854.39 |
| Average MW | | 81.293 | 50.10 | 91.53 | 105.31 | 102.15 | 104.45 |
| Mole Flows | kmol/hr | 3.0753 | 1.04 | 1.20 | 0.84 | 0.13 | 0.67 |
| Mass Flows | kg/hr | 250.00 | 52.00 | 110.00 | 88.00 | 13.18 | 70.00 |
| Acrylonitrile (ACN) | kg/hr | 46.57 | 45.57 | 1.00 | 2.38E−05 | 2.38E−05 | |
| Toluene (TOL) | kg/hr | 115.20 | 3.98 | 108.92 | 2.30 | 2.30 | 1.77E−05 |
| Styrene (STY) | kg/hr | 80.88 | | 0.05 | 80.83 | 8.72 | 69.36 |
| Heavies (HEA) | kg/hr | 2.45 | | | 2.45 | | 0.39 |
| Ethylbenzene (EB) | kg/hr | 2.45 | | 0.03 | 2.42 | 2.16 | 0.25 |
| Water (WAT) | kg/hr | 2.45 | 2.45 | 0.001 | | | |
| TPG | kg/hr | | | | | | |
| | | \multicolumn{6}{c}{Mass Fractions} | | | | | | |
| Acrylonitrile (ACN) | | 0.1863 | 0.8763 | 0.0091 | 2.70E−07 | 1.80E−06 | |
| Toluene (TOL) | | 0.4608 | 0.0766 | 0.9901 | 0.0261 | 0.1743 | 2.52E−07 |
| Styrene (STY) | | 0.3235 | | 0.0005 | 0.9185 | 0.6617 | 0.9909 |
| Heavies (HEA) | | 0.0098 | | | 0.0279 | | 0.0055 |
| Ethylbenzene (EB) | | 0.0098 | 0.0003 | | 0.0275 | 0.1640 | 0.0036 |
| Water (WAT) | | 0.0098 | 0.0471 | 1.27E−05 | | | |
| TPG | | | | | | | |

| | | \multicolumn{5}{c}{Stream Name and Number of FIG. 8} | | | | | |
|---|---|---|---|---|---|---|
| Property | Unit | HEA2 822 | ACN2 832 | SOLVENT/ WAT 831 | WAT 842 | SOLVENT 841 |
| Temperature | °C. | 86.18 | 17.65 | 53.04 | 70.94 | 207.18 |
| Pressure | bar | 0.11 | 0.10 | 0.11 | 1.00 | 3.25 |
| Mass Density | kg/m$^3$ | 849.13 | 810.00 | 962.62 | 778.59 | 822.21 |
| Average MW | | 132.59 | 52.05 | 154.38 | 41.36 | 168.95 |
| Mole Flows | kmol/hr | 0.04 | 0.48 | 2.12 | 0.24 | 1.88 |
| Mass Flows | kg/hr | 4.82 | 25.00 | 327.00 | 10.00 | 317.00 |
| Acrylonitrile (ACN) | kg/hr | | 24.66 | 20.91 | 7.70 | 13.21 |
| Toluene (TOL) | kg/hr | 2.28E−07 | 0.07 | 3.91 | 0.69 | 3.21 |
| Styrene (STY) | kg/hr | 2.74 | | 5.99E−09 | | 5.97E−09 |
| Heavies (HEA) | kg/hr | 2.07 | 0 | 0 | 0 | 0 |
| Ethylbenzene (EB) | kg/hr | 0.01 | | 1.06E−08 | | 1.05E−08 |
| Water (VAT) | kg/hr | | 0.27 | 2.18 | 1.61 | 0.58 |
| TPG | kg/hr | | 8.02E−08 | 300.00 | | 300 |

TABLE I-continued

| | Mass Fractions | | | | |
|---|---|---|---|---|---|
| Acrylonitrile (ACN) | | 0.9865 | 0.0639 | 0.7699 | 0.0417 |
| Toluene (TOL) | 4.74E-08 | 0.0029 | 0.0119 | 0.0695 | 0.0101 |
| Styrene (STY) | 0.5695 | | | | |
| Heavies (HEA) | 0.4289 | | | | |
| Ethylbenzene (EB) | 0.0015 | | | | |
| Water (WAT) | | 0.0106 | 0.0067 | 0.1606 | 0.0018 |
| TPG | | 3.21E−09 | 0.9174 | | 0.9464 |

Notes for Table I:
"kg/m3" is kilograms per cubic meter.
"kmol/hr" is kilomoles per hour.
"kg/hr" is kilograms per hour.

To generate the data described in Table I above, a process modeling tool, Aspen, is used to design the columns for the separation. The thermodynamic model that can be used in the above Examples can be NRTL (Non-Random Two Liquid) theory; any missing binary interaction parameters can be regressed by obtaining vapor-liquid equilibrium data from measurements, or literature, or can be estimated using UNIFAC (UNIQUAC Functional-group Activity Coefficients).

Other Embodiments

As described above, one embodiment of the present invention includes a process for recovering monomers and solvent present in a waste stream including the steps of: (a) providing a waste feed stream containing monomers, solvent and impurities; (b) subjecting the waste feed stream of step (a) to a separation process under conditions for separating the monomers and solvent from the impurities of the waste stream; (c) recovering the monomers and solvent in one or more streams; and (d) passing the one or more of the monomers and solvent streams from step (c) to further processing.

In one preferred embodiment, the waste feed stream of the above process of the present invention contains at least one solvent, at least one styrene monomer, at least one acrylonitrile monomer, ethylbenzene, heavies and water.

In another preferred embodiment, step (b) of the above process includes a waste stream wherein at least 30 percent of the solvent in the waste stream is removed from the waste stream; wherein at least 10 percent of the styrene monomer in the waste stream is removed from the waste stream; wherein at least 10 percent of the acrylonitrile monomer in the waste stream is removed from the waste stream; and wherein at least 90 percent of the water in the waste stream is removed from the waste stream.

In still another preferred embodiment, step (c) of the above process includes a recovered solvent stream, wherein the solvent stream removed from the waste stream has a purity of at least 90 percent; a recovered styrene monomer stream, wherein the styrene monomer stream removed from the waste stream has a purity of at least 98 percent; and a recovered acrylonitrile stream, wherein the acrylonitrile monomer stream removed from the waste stream has a purity of at least 90 percent.

As described herein, another embodiment of the present invention includes a process for producing a copolymer polyol including the steps of: (I) providing a reaction mixture of monomers in the presence of a solvent; (II) subjecting the reaction mixture of step (I) to reaction conditions to form a copolymer polyol product in combination with residual monomers, solvent and impurities; (III) separating the copolymer polyol product from the residual monomers, solvent and impurities forming at least a first stream of copolymer polyol product and at least a second stream of waste product including residual monomers, solvent and impurities; and (IV) recovering the copolymer polyol product stream.

One preferred embodiment of the above copolymer polyol production process includes a further step of: (V) recycling the waste stream of residual monomers, solvent and impurities to the reaction mixture of monomers in the presence of a solvent of step (I).

Another preferred embodiment of the above copolymer polyol production process includes the further the steps of: (VI) subjecting the waste feed stream from step (III) to a separation process under conditions for separating the monomers and solvent from the impurities of the waste stream; (VII) recovering the monomers and solvent in one or more streams; and (VIII) recycling the one or more streams of the monomer and solvent from step (VII) to the reaction mixture of monomers in the presence of a solvent of step (I).

As described herein, the present invention also includes a process for separating acrylonitrile from water including the steps of: (A) feeding an azeotrope composition of acrylonitrile and water to an extractive distillation column; and (B) distilling the acrylonitrile from water by extractive distillation in the extractive distillation column using an extraction solvent.

One preferred embodiment of the above extractive distillation process includes the use of tripropylene glycol as the solvent.

Another preferred embodiment of the above extractive distillation process includes the use of an extractive distillation column to carry out the above extractive distillation process wherein the column pressure is less than 0.15 bar; and a condenser used with the column is at a temperature of less than 25° C.

Still another preferred embodiment of the above extractive distillation process includes the use of an extractive distillation column wherein the water is removed from the azeotrope at from 50 percent to 99 percent.

What is claimed is:

1. A process for recovering and recycling monomers and solvent present in a waste stream from a copolymer polyol production process, the recovering and recycling process comprising the steps of:
   (a) providing a waste feed stream from the copolymer polyol production process, the waste feed stream containing styrene and acrylonitrile monomers, solvent and impurities;

(b) subjecting the waste feed stream of step (a) to a separation process under conditions for separating the monomers and solvent from the impurities of the waste stream, the separation process including:
  (i) separating the waste feed stream in a first distillation column to form a first overhead stream containing acrylonitrile and water, a first side-stream containing solvent and a first bottoms stream containing styrene;
  (ii) feeding the first bottoms stream into a second distillation column to form a second overhead stream containing impurities, a second side-stream containing styrene, and a second bottoms stream that includes the impurities;
  (iii) feeding the first overhead stream into an extractive distillation column to form an extractive overhead stream containing acrylonitrile, and extractive bottoms stream that includes water, and an extraction solvent;
  (iv) feeding the extractive bottoms stream to a third distillation column to form a third overhead stream that includes water and a third bottoms stream that includes the extraction solvent;
(c) recovering the monomers and solvent from the first side-stream, the second side-stream, and the extractive overhead stream; and
(d) passing the one or more of the monomers and solvent from step (c) to the feed stream in the copolymer polyol production process.

2. The process of claim 1 wherein the waste feed stream contains (ai) an initial content of solvent of 20 weight percent to 60 weight percent; (aii) an initial content of styrene monomer of 10 weight percent to 50 weight percent; (aiii) an initial content of acrylonitrile monomer of 5 weight percent to 35 weight percent; (aiv) an initial content of ethylbenzene of 0 weight percent to 5 weight percent; (av) an initial content of water of 0 weight percent to 5 weight percent; and (avi) an initial content of undesired heavies of 0 weight percent to 5 weight percent; and wherein, after separating at least a portion of the solvent, styrene monomer and acrylonitrile monomer from the waste feed stream in step (b), a separated waste stream from step (b) contains (bi) a reduced content of solvent of 0 weight percent to 30 weight percent; (bii) a reduced content of styrene monomer of 0 weight percent to 25 weight percent; (biii) a reduced content of acrylonitrile monomer of 0 weight percent to 20 weight percent; (biv) a reduced content of ethylbenzene of 0 weight percent to 3 weight percent; (bv) a reduced content of water of 0 weight percent to 3 weight percent; and (bvi) a reduced content of undesired heavies in the range of 0 weight percent to 3 weight percent.

* * * * *